Patented Nov. 3, 1925.

1,559,731

UNITED STATES PATENT OFFICE.

GEORGE J. MULLER, OF BALTIMORE, MARYLAND.

PLASTIC COMPOSITION.

No Drawing.   Application filed February 9, 1922. Serial No. 535,361.

*To all whom it may concern:*

Be it known that I, GEORGE J. MULLER, a citizen of the United States, residing at Baltimore, in the State of Maryland, have invented certain new and useful Improvements in Plastic Compositions, of which the following is a specification.

This invention relates to a composition having as one of its constituents, a heavy hydrocarbon such as asphalt, bitumen, coaltar, pitch or the like, and which, while retaining the inherent qualities of the hydrocarbon base, such as fusibility under conveniently available temperatures, and resistance to water and other weather conditions, as well as to most acids, will have the additional qualities, even under extremely high atmospheric temperatures, of remaining solid and retaining its given form, with surface dryness or non-adhesiveness; availability for use as a coating or filler for fabrics and other materials, and as a finish or protecting surface for metals or other substances; adaptability for molding or forming into receptacles, for instance battery containers or other objects, and for production in the form of sheets, plates, blocks or other construction materials; and withal, cheapness of production and constancy in the retention of the important characteristics enumerated.

It has long been proposed to compound with heavy hydrocarbons of one or more of the kinds named, a filler in the form of a finely subdivided mineral substance for the purpose of producing a composition with higher melting point and some others of the qualities herein recited, although without surface dryness. For this purpose silica, limestone and other carbonates, clay and other argillaceous material, and even some forms of slate have been suggested. But these have all failed to give results equivalent to those obtainable with the present method of treating hydrocarbons or from the products of such method. Silica is too heavy to remain thoroughly in suspension and maintain homogeneity of the composition; carbonates cause ebullition and foaming under the fusing temperature of the hydrocarbon; clay or argillaceous substances involve the prohibitive expense of drying and labor of mixing; the slates heretofore used are sufficiently rich in corbonates or argillaceous materials to manifest the difficulties thereof; and all these materials with the exception of silica (objectionable for the other reason stated) involve the inherent characteristic of massing, lumping or balling in the hydrocarbon and defeating or rendering very expensive proper mixing, besides producing unsatisfactory results when added in large percentages and failing wholly to prevent surface tackiness or adhesiveness.

The present invention proceeds upon the discovery that if a hydrocarbon of a specific gravity suitable for producing a plastic composition, for instance, asphalt showing a penetration test of say 30, and a melting point of say 180° F., have thoroughly stirred into it a mineral filler composed of a finely subdivided slate that is substantially free from iron in the form of ferric oxide, from carbonates, and from argillaceous matter, but containing carbon in the form of graphite, plastics of varying degrees of hardness can be produced according to the proportion of filler used, and all of these plastics will be very materially increased in fusing point, will have freedom from running or losing form under extreme atmospheric temperatures, and freedom from surface stickiness; and will retain the quality of toughness, high resistance to fracture, and capacity for being produced at minimum cost for filling material and for mixing.

A filling material of the kind named and which I shall refer to as graphitic slate becomes distributed with great readiness through the mass of hydrocarbon, because, of the presence in the filler of carbon in the form of graphite which induces permeation of the voids in the powdery mass by the hydrocarbon; and the compounding is so superior to that attempted with other fillers that the proportion of extremely fine filler to hydrocarbon, may be run up to a very large percentage, for instance to 75 per cent or even 90 per cent without impairing the qualities of the resultant composition. Moreover, due to the low absorbing capacity of the particles of finely subdivided graphitic slate as distinguished from permeability of the voids of a powdery mass thereof, which latter condition is due to the readiness with which the particles are wetted when mixed with bituminous hydrocarbon, there is freedom from exuding of hydrocarbon under high pressures that may be used in shaping the composition into or applying it to articles of use; and the surface of the resultant composition is dry and free from stickiness.

A slate that embodies the characteristics stated, and is available in such quantities as to be very cheap and which I have employed in carrying out the present invention, is the so-called "Peach Bottom slate." For official recognition of the source and identity of this slate reference may be had to pages 110 to 114 inclusive of U. S. Geological Bulletin No. 586, entitled "Slate in the United States" published by the Government Printing Office, Washington, D. C. 1914. While the chemical elements entering into this mineral may be ascertained quantitatively, through the same report, I have found through personal research that these elements exist in mineralogical or physical form that renders the natural material available when reduced to powdered form for entering into advantageous compositions with bituminous hydrocarbons as herein set forth. That is to say this slate unlike other slates, when finely subdivided, retains its inherent physical properties, of resisting acids, alkalies, weather conditions and water. These results I believe to be largely due to the facts that Peach Bottom slate contains carbon in the form of graphite, its iron content is in the form of magnetite; and its aluminum is in the form of the silicate; that while it contains carbonates (e. g. calcium carbonate) the proportion is too small to impair the results sought for; and its manganese and titanium constitute mere traces and are not believed to influence the result and are certainly without detriment.

The ready mixing and complete distribution of the filler named, in compounding the substance, greatly facilitates control of proportions and therefore of the physical condition and behavior of the composition, for instance, in the development of ridges or sinuous streaks upon the surface of roofing material being coated; and no ebullition occurs to impair the work, as a result of the melting temperature of the hydrocarbon.

Other advantages of the new process of treating heavy hydrocarbon to produce the plastic, are that the graphitic slate produces a higher grade of plastic at a very low cost for materials. It adds material weight to the composition with much less than proportional increase of volume. In present-day practice, when a quantity of inert filler has been mixed with hydrocarbon, it has generally been customary to use from 70 per cent to 80 per cent of what is termed aggregate (subdivided material coarser than 200 mesh fineness) 10 per cent to 15 per cent of filler (material finer than 200 mesh), and the balance hydrocarbon. By using the herein-described graphitic filler, (Peach Bottom slate), it is possible to secure thorough permeation even when the entire 75 per cent to 90 per cent of filler is of the greater fineness (finer than 200 mesh). The advantages in making all the filler of greater fineness are that no particles or pieces of inert material are visible to the eye; pressed surfaces are smoother; the material can be cut, sawed, drilled, punched or nailed, without encountering a filler particle large enough to obstruct the penetrating instrument, and therefore without splitting or impairing the material.

As an example of the practice of the invention, place between the melting kettles and rolls of a felt roofing machine, heated mixers into which is run 650 pounds of asphalt having a penetration test of 30 (when cold) and a melting point of 180° F. To this gradually add, and stir in 350 pounds of Peach Bottom slate reduced to a fineness beyond that which passes through a 200 mesh screen. Mix thoroughly, and the loaded or filled coating thus produced is ready for use and may be applied to the web of felt just as in the cases where the ordinary asphalt surfacing is used. The finished product will show a penetration test of but 18, and a melting point of 216° F.; the goods will be tough and pliable and the surface dry and free from stickiness. Good results are obtained in roofing, by the use of from 30 per cent to 40 per cent of the aforesaid Peach Bottom slate of the greater fineness stated.

When as much as 75 per cent of the graphitic slate has been added to a hydrocarbon having a penetration of 34 and a melting point of 198° F., the resultant composition has shown a penetration of only 8, and a melting point of 307° F.

I do not limit myself to the use of filler of the fineness stated. Rather do I seek, by stating the same, to indicate that which is most desirable, and to emphasize the advantages of my discovery that the use of a graphitic slate of the kind described, will permit the use of very much finer filler and permit using all the filler at the extremely fine reduction. But the same characteristics of graphitic slate facilitate the thorough penetration even of the coarser filler and the use of even the coarser filler of this kind insures against the objectionable conditions incident to the use of fillers of the other kinds herein named.

I claim:

1. A composition consisting of a bituminous hydrocarbon and Peach Bottom slate in finely subdivided form.

2. A composition consisting of a bituminous hydrocarbon and a finely subdivided slate containing carbon in graphitic form.

3. A composition consisting of a bituminous hydrocarbon and a slate containing carbon in graphitic form and substantially free from ferric oxide.

4. A composition consisting of a bituminous hydrocarbon and a filler consisting of a finely subdivided slate containing carbon in graphitic form, and substantially free from carbonates and from ferric oxide.

5. A plastic composition consisting of asphalt having a substantial resistance to penetration, and a finely subdivided graphitic slate.

6. A plastic composition consisting of from about 70 per cent to about 10 per cent of bituminous hydrocarbon having a substantial resistance to penetration, and from about 30 per cent to about 90 per cent of graphitic slate in finely subdivided form.

7. A solid substance composed of a bituminous hydrocarbon and finely subdivided Peach Bottom slate, and having the inherent physical characteristic of retention of form.

In testimony whereof I affix my signature.

GEORGE J. MULLER.